March 13, 1962    H. E. TATEL ETAL    3,025,521

ANTI-COLLISION SYSTEM FOR SHIPS AND PLANES

Filed July 16, 1957    13 Sheets-Sheet 1

INVENTORS.
HOWARD E. TATEL
and JULES H. SREB

BY

ATTORNEY.

INVENTORS.
HOWARD E. TATEL
and JULES H. SREB

March 13, 1962     H. E. TATEL ETAL     3,025,521
ANTI-COLLISION SYSTEM FOR SHIPS AND PLANES
Filed July 16, 1957     13 Sheets-Sheet 3
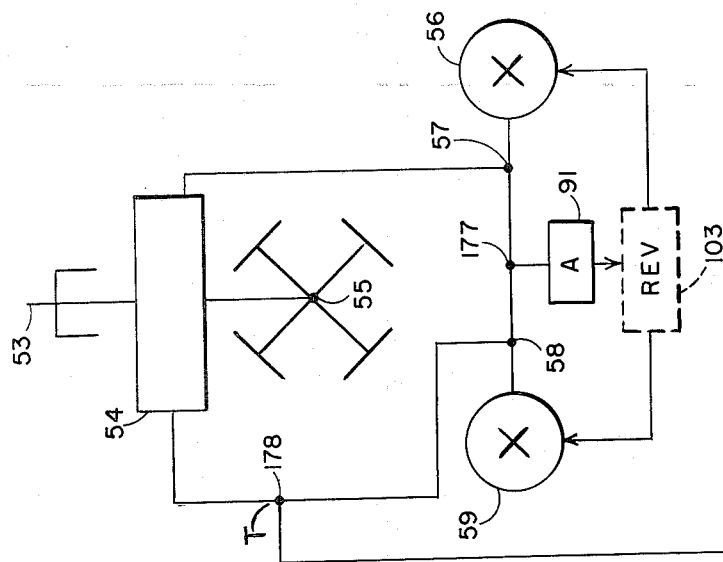
FIG. 4
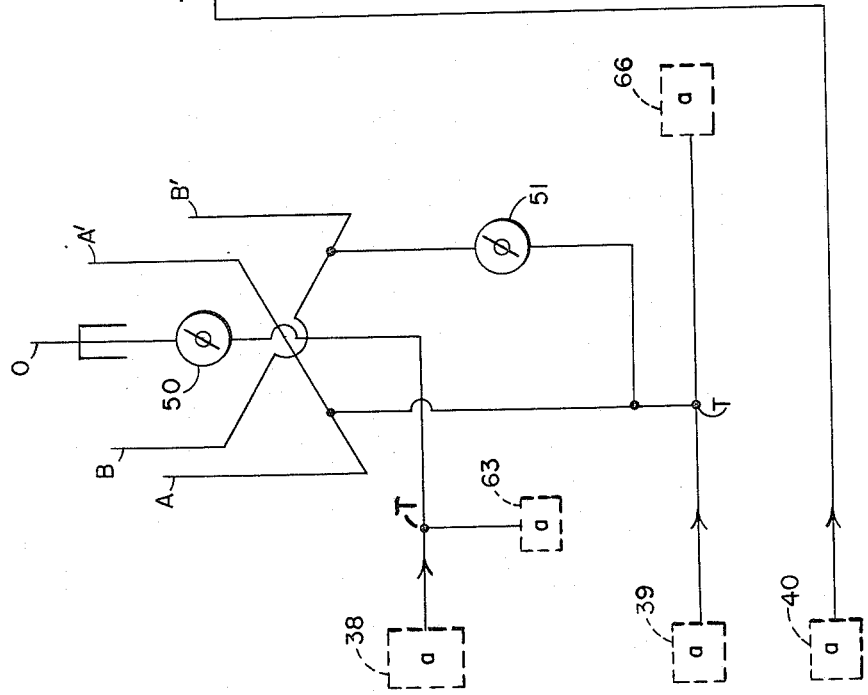
INVENTORS.
HOWARD E. TATEL
and JULES H. SREB
BY
ATTORNEY.

INVENTORS.
HOWARD E. TATEL
and JULES H. SREB
BY
ATTORNEY.

INVENTORS.
HOWARD E. TATEL
and JULES H. SREB

March 13, 1962  H. E. TATEL ETAL  3,025,521
ANTI-COLLISION SYSTEM FOR SHIPS AND PLANES
Filed July 16, 1957  13 Sheets-Sheet 11

INVENTORS.
HOWARD E. TATEL
and JULES H. SREB
BY
ATTORNEY

March 13, 1962 H. E. TATEL ETAL 3,025,521
ANTI-COLLISION SYSTEM FOR SHIPS AND PLANES
Filed July 16, 1957 13 Sheets-Sheet 12

INVENTORS.
HOWARD E. TATEL
and JULES H. SREB
BY
ATTORNEY.

INVENTORS.
HOWARD E. TATEL
and JULES H. SREB
BY
ATTORNEY.

United States Patent Office 3,025,521
Patented Mar. 13, 1962

3,025,521
ANTI-COLLISION SYSTEM FOR SHIPS
AND PLANES
Howard E. Tatel, Silver Spring, Md., and Jules H. Sreb, Washington, D.C., assignors of 21 25/100 percent to William L. Abramowitz, Swampscott, Mass., 21 25/100 percent to William Epstein, and 15 percent to Joseph Zallen, both of Brookline, Mass., 27 50/100 percent to said Tatel, and 15 percent to said Sreb; Molly Tatel, executrix of said Howard E. Tatel, deceased
Filed July 16, 1957, Ser. No. 672,203
16 Claims. (Cl. 343—112)

This invention relates to an anti-collision warning system for ships and planes. In particular, it relates to a method whereby for ship or plane, a continuous and automatic presentation is made in all weather conditions showing a simple vectorial picture giving all the relative directions and angles of motion of all its neighbors with respect to its own direction of motion, thus providing information enabling the avoidance of collision.

One copending application of one of the present applicants, Howard E. Tatel, Serial No. 629,842, filed December 21, 1956, entitled "Anti-Collision System for Ships and Planes," discloses a system wherein each craft has a radio beacon emitting prescribed signals in all directions at a single universal frequency and a radio receiver operative at this universal frequency which instantaneously displays the bearing of the reading craft and the heading of any neighboring craft as pairs of intersecting vectors. The specific embodiment described therein utilizes a beacon emitting an omnidirectional component isotropic in phase and amplitude and another component whose phase only depends upon direction of transmission. In one form, the transmitted signal contains an omnidirectional RF component modulated by a reference signal and an RF component modulated by a signal which is a multiple of the reference signal and whose phase angle of modulation with respect to the multiple of the reference signal is proportional to the angle that the direction of transmission to the receiving vessel makes with the direction of motion of the transmitting vessel (heading). The receiver demodulates both the direction-sensitive and reference components, transforms the reference component to the same multiple frequency as the direction-sensitive component and maintains its phase precisely as at the transmitter, and compares the phase angle difference, namely, heading. The bearing is obtained by receiving an unmodulated RF signal component on both a directional sensitive antenna and omnidirectional antenna, balance modulating each with AF signals of frequency equal to an internal reference signal, and comparing the phase angle difference, namely, bearing. It is preferred that the transmitter and receiver on each craft are operated alternately and in the random manner. For planes, it is preferred that the universal frequency for each altitude zone be different and automatically shifted as the plane goes from one zone to another. Altitude information is supplied by a different multiple of the modulation on the RF carrier. Presentation is preferably made on a persistent-screen cathode ray tube.

A second copending application of said Howard E. Tatel, Serial No. 665,440, filed June 13, 1957, entitled "Anti-Collision System for Ships and Planes" differs from the first copending application in disclosing emission of a signal from a beacon with transmission sequence control so that each signal consists of two successive unmodulated pulses of equal time length, one pulse feeding an antenna component isotropic in the horizontal plane (isotropic antenna component) and the other an omnidirectional antenna component which shifts phase by an angle depending upon the direction of transmission. In the receiver, the first half of each signal is received and delayed a time equal in length to half a signal so that both halves of the signal are simultaneously phase-compared to show heading. Bearing is provided for the whole pulse length by phase comparison of the signal received in one channel from the isotropic antenna component and the signal received in a second channel from the directionally sensitive antenna component.

In the present invention a signal is emitted at the selected universal frequency from radio beacon in the form of a coded unmodulated RF signal containing bearing, heading, and interrogating pulses, and, for planes, preferably, also altitude pulses. The bearing, heading pulses, and altitude pulses, upon reception by neighboring craft actuate the indicator to show bearing, heading, and relative altitude of the transmitting craft within its zone and the adjacent zones above and below. The interrogating pulses also cause each receiving craft to transpond in the form of a short RF pulse so that the sending craft receives it delayed by the finite velocity of propagation of radio waves, thus providing information as to distance. The transmitting of a command pulse cocks the receiving system of the transmitter craft so that it responds to the transponded pulse only in the appropriate interval. By means of a third reception channel ground reflections are recognized and their signals suppressed thereby preventing spurious ground echoes from cluttering the display.

A random pulse generator at a mean rate of once every few seconds initiates the transmission pulse system which successively:

(a) Energizes an altitude information pulse or pulses whose length and/or position is regulated by an altitude sensitive device and then feeds it to an antenna component omnidirectional in the horizontal plane, (b) Energizes a pulse of predetermined length and then feeds it to an antenna component isotropic in the horizontal plane, (c) Energizes a pulse of predetermined length and then feeds it to an omnidirectional antenna component which shifts the RF phase by an angle depending upon the direction of transmission, (d) Energizes a number of short pulses and feeds them for planes, to the combination of a vertical dipole and a horizontal magnetic dipole radiator both isotropic in the horizontal plane properly phased to produce circularly polarized radiation in the horizontal plane, and for ships to an antenna component isotropic in the horizontal plane. At the receiver the altitude information pulse is received from an antenna component isotropic in the horizontal plane, compared with a receiver-generated altitude pulse; and the difference serves to control the deflection voltage fed to the radial deflection electrode of a cathode ray tube as described in the first copending patent application. Following this, successive pulses are received by the neighboring craft through an antenna component isotropic in the horizontal plane and then fed to a first receiver channel and also by a directionally phase-sensitive antenna component and fed to a second channel. The phase of the two resultant signals is compared to give bearing. The pulses of predetermined length received by the first channel are also fed to both a delay line and to an electronic switch arranged to open only upon onset of the second pulse of predetermined length. Simultaneous phase comparison of these two pulses, one delayed and the other not, provides, the phase difference corresponding to the direction of emission at the transmitter, hence heading.

The terminal short pulses are received on ships by an antenna component isotropic in the horizontal plane and on planes by a combination of vertical dipole and horizontal array of dipole radiators both isotropic in the horizontal plane and fed to a separate receiver channel and also to means actuating a transponding pulse on the transmitter on the receiving craft without regeneration. Furthermore, the system is so arranged that the transponse takes place only at the onset of the first pulse transmitted directly, the ground echo is not answered. Again upon reception of the transponded signal, the effect of the ground on the polarization is recognized and upon recognition is suppressed so that the ground echo cannot clutter the display screen.

With this present invention, each craft receives positive independent alarms from neighboring craft upon reception of the beacon portion of the signals and the transponded portions of the signals in addition to bearing-heading information, and further is enabled to instantaneously determine bearing-distance and bearing-heading simultaneously. Velocity is determined in a matter of a few seconds by the observation of the interleaved display of the bearing range dots. With planes bearing-altitude is also shown on the same display. It is preferred in this invention as in the copending applications, that the transmitter and receiver on a particular craft be operated alternately and randomly to permit effective operation in heavy traffic at the single universal frequency, the transmitting occupying a relatively small portion of the total time. Also, for planes, it is preferred that such frequency be different for each altitude zone and be automatically adjusted as the plane passes from one zone to another.

For a fuller understanding of this invention reference is made to a specific embodiment suitable for aircraft, described below and in the drawings wherein:

FIGURE 4 is a schematic diagram of the antenna system.

Figure 11:
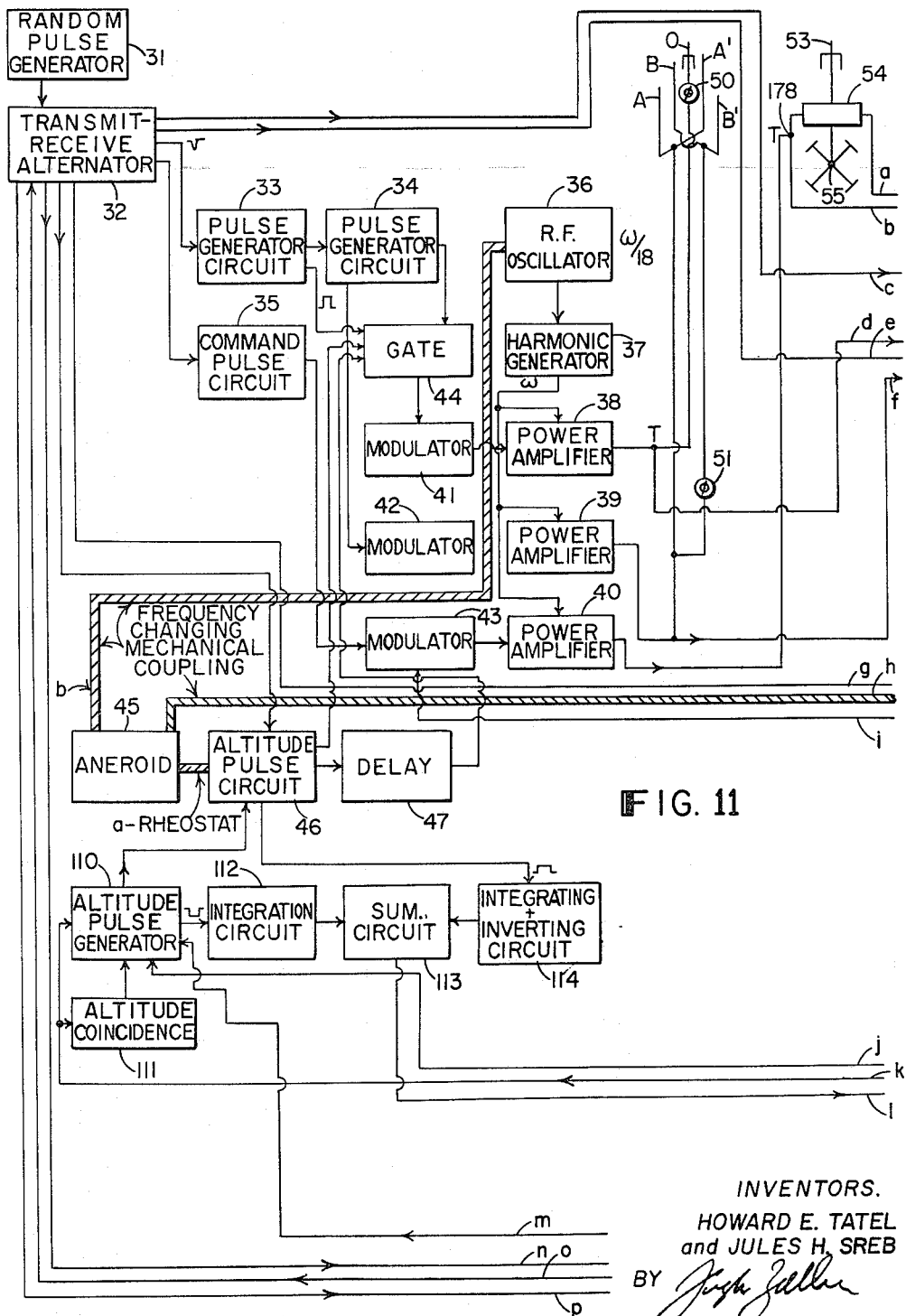
Figure 11A:
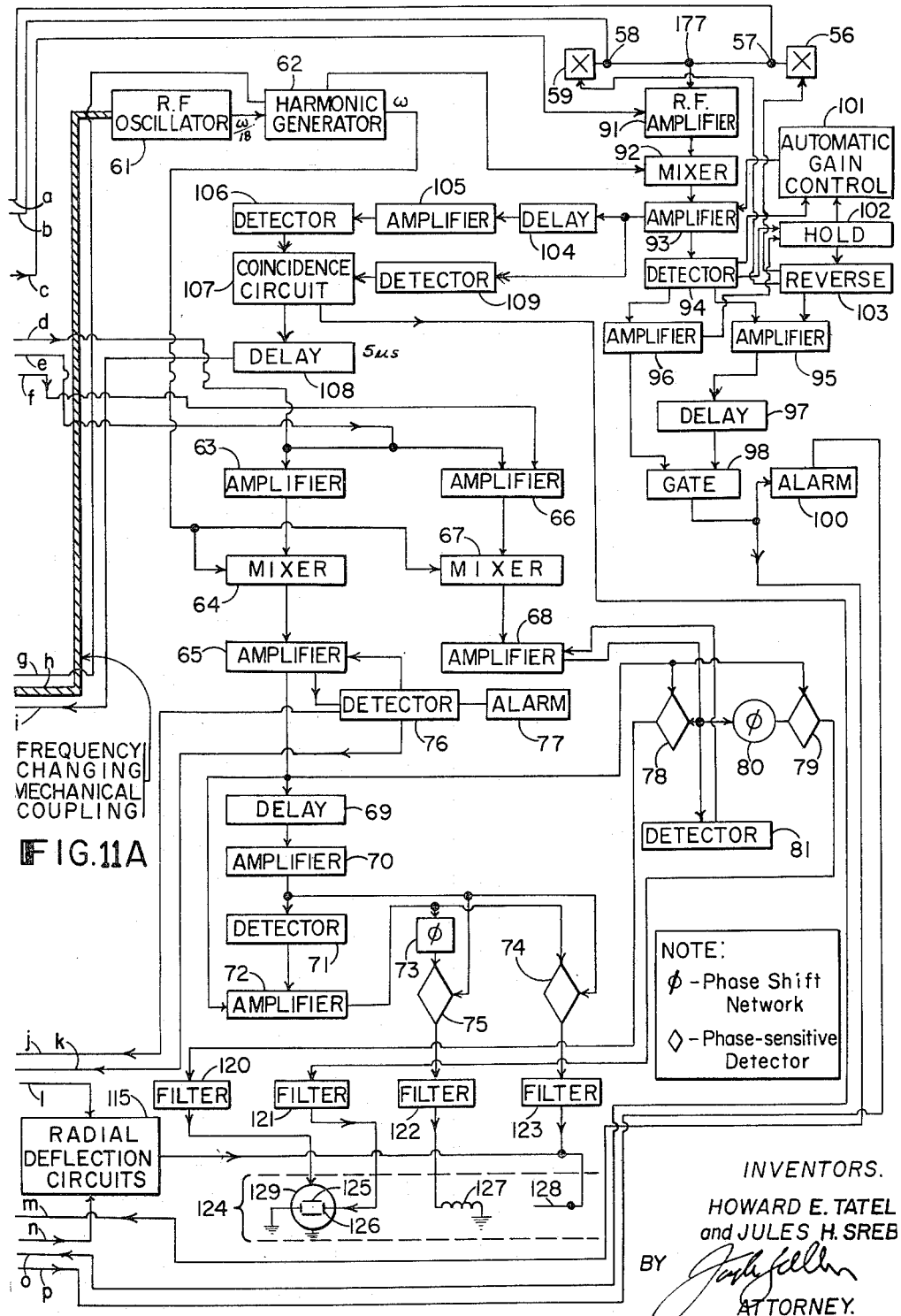

FIGURES 11 and 11A together represent a single schematic diagram of the transmitter, antenna, receiver, command, altitude comparison and cathode ray tube display circuit.

Figure 12:
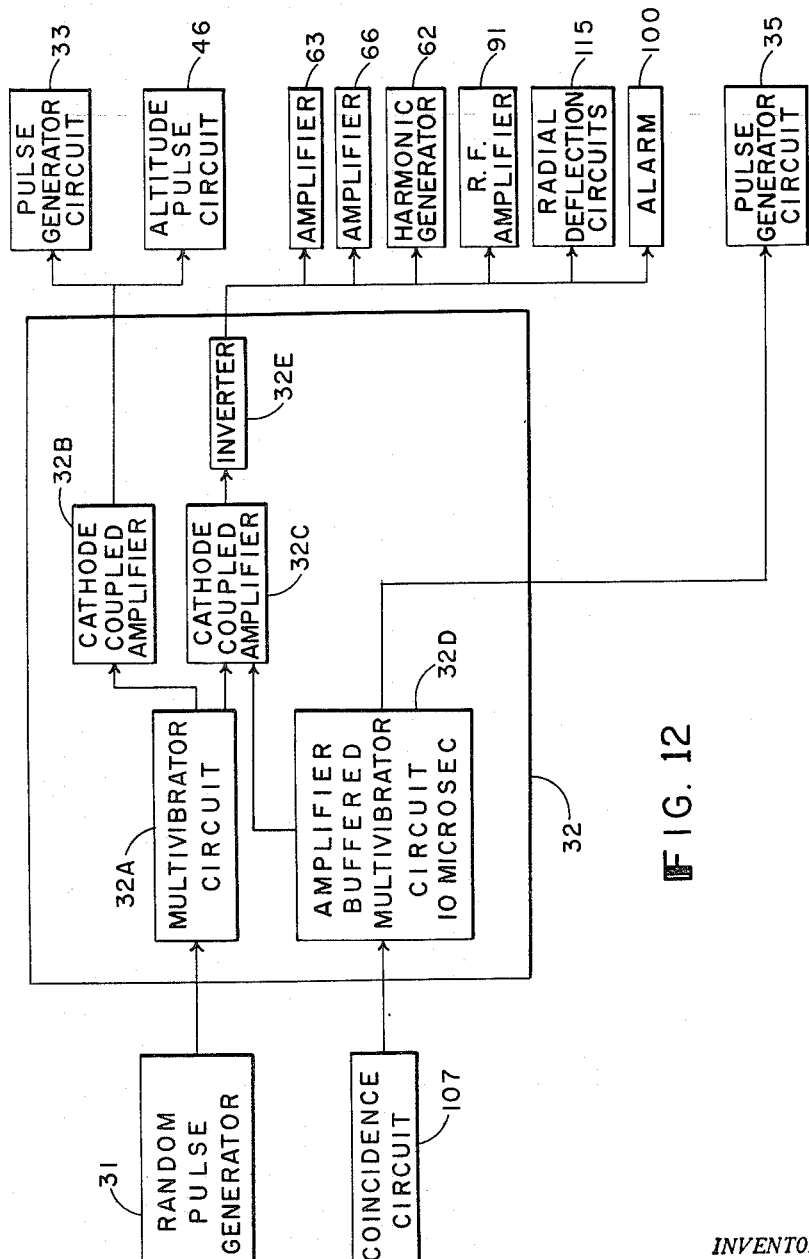

FIGURE 12 is a schematic diagram of the intermodulator 32 (transmit-receive switch).

Figure 13:
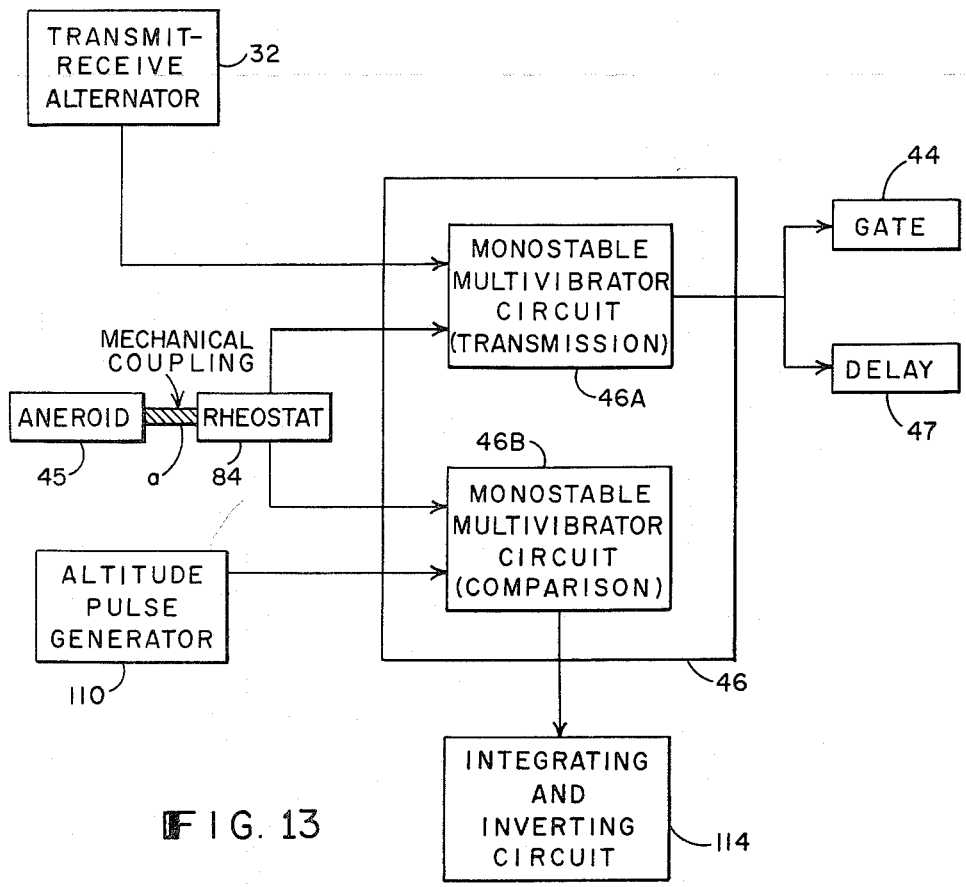

FIGURE 13 is a schematic diagram giving detail of the altitude time pulse circuit 46.

Figure 14:
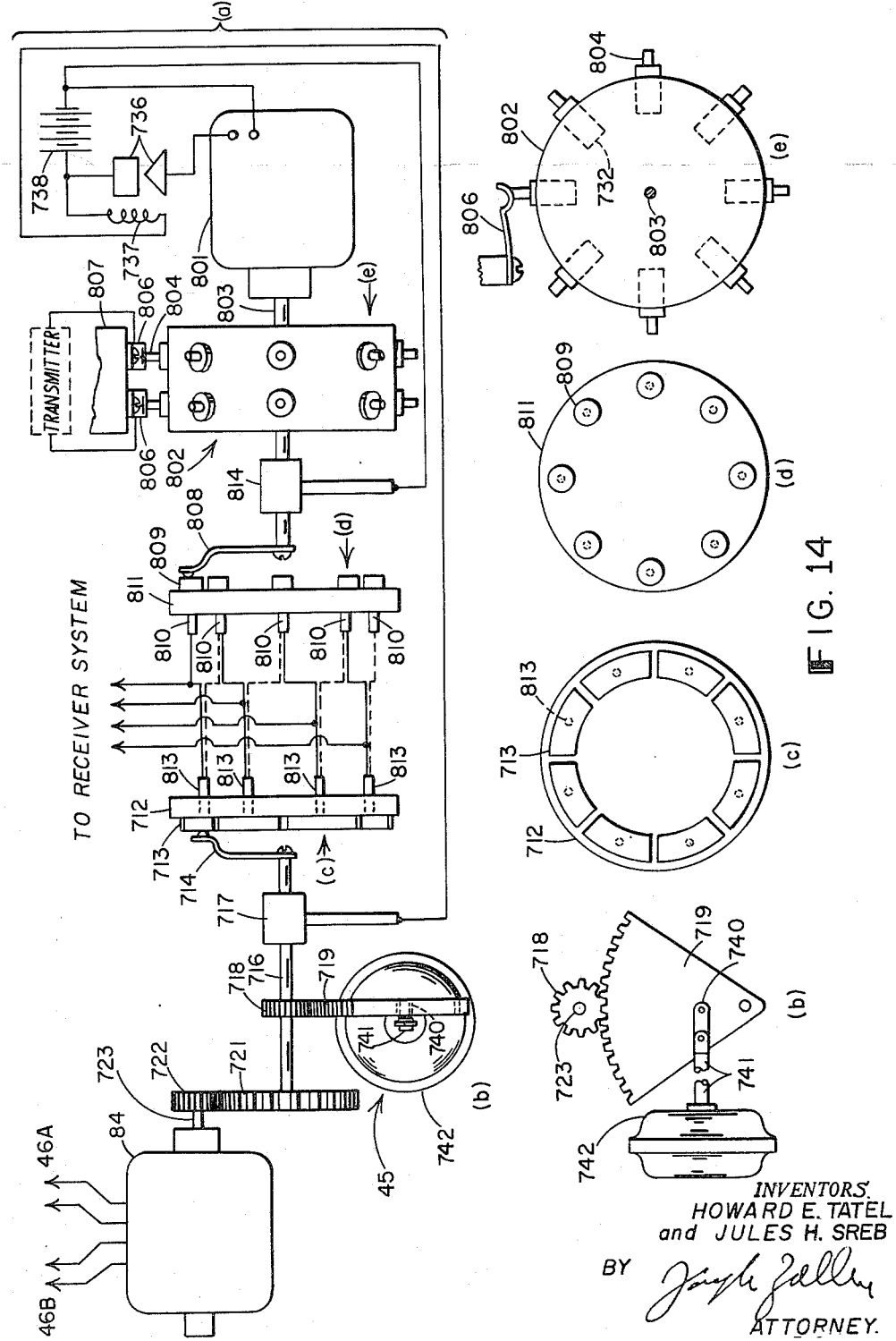

FIGURE 14 illustrates the mechanical aneroid arrangement for rheostat and frequency shifting.

Figure 2:
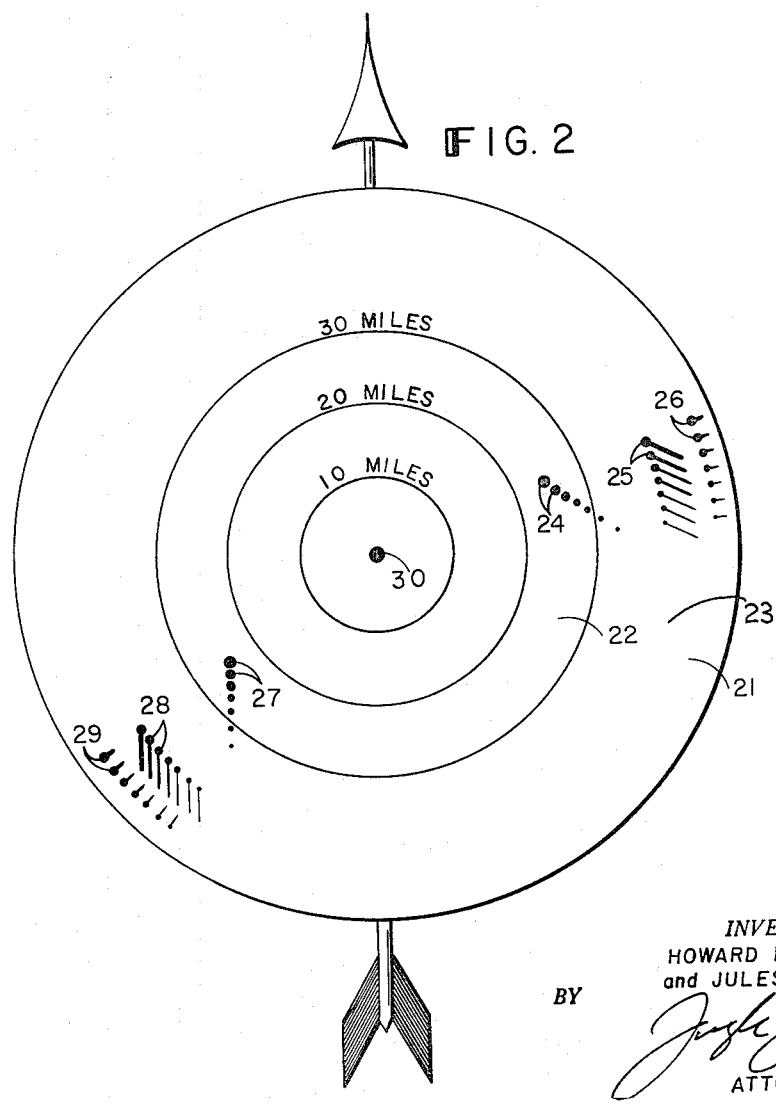
FIGURE 2 is a schematic view of the displayed information of bearing, heading, altitude and range on the face of a cathode ray tube.

In the specific embodiment described in detail below, the presentation indicator is preferably the screen of a single cathode ray tube, though separate oscilloscopes can be used. In FIGURE 2 the outer ring contains dots 26 and 29 with radial tails. The arrays of dots indicate successive bearings of each of two neighboring craft, and the tails relative altitude of each craft with respect to the reading craft, inward tails meaning lower altitude and outward tails meaning higher altitude (this is a matter of convention). Dots 28 and 25 in the next inner ring are also successive bearings with the tails being vectors showing heading. Dots 27 and 24 are bearing-range. In operation, the alarm rings and the pilot immediately sees bearing altitude in the outer ring, bearing-heading in the central ring and bearing-range displayed in the inner zone. The spacing of successive dots 24, 27 give an indication of relative velocity, and fading of the dots the direction of motion. The successive dot-vectors give bearing and heading in annulus 23, relative bearing-altitude in annulus 21, and range, bearing, and relative velocity in circular section 22. All the coordinates displayed have bearing in common for any craft.

Figure 1:
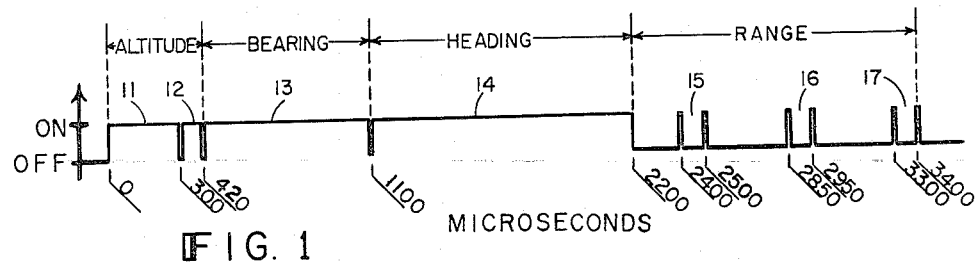
FIGURE 1 is a schematic drawing of a complete transmitted pulse train.

The basic transmitted pulse train illustrated in FIGURE 1 comprises a selected total length in this case of approximately 4500 microseconds. The RF transmission starting at zero seconds has an approximately 5 microsecond break at 300 and 420 microseconds. At 1100 microseconds the transmission is changed from the isotropic radiator to the phasing radiator, the latter ending at approximately 2200 microseconds. There follows a series of 100 microsecond command pulse sets of two pulses each transmitted from the polarizing antenna. The time interval between sets is about 350 microseconds depending upon the range selected for the system (30 mile range is approximately 320 microseconds). Typically there would be about 5 sets of these pairs of pulses.

The aforementioned 5 microsecond break serves to transmit the altitude information. The first pulse falls at a point in the interval 300±200 microseconds depending on the altitude difference, the second break is at a fixed time later, 120 microseconds. The altitude at the center of the zone corresponds to a 300 microsecond pulse. At the lower boundary of the normal operating zone the pulse is 233 microseconds in length, at the upper zone boundary the pulse length is approximately 366 microseconds. When interrogating the zone above the pulse length extends from 100–233 microseconds. When interrogating the zone below, the pulse length is 366 to 500 microseconds, all proportional to altitude.

During the first 1100 microseconds the angular position of the spot is set by the bearing angle as received by the isotropic radiator and the phased radiator. The angular position of spot 29 is equal to the bearing angle of the transmitting plane.

In the 0–620 microsecond interval the normal cathode ray spot position is in the altitude annulus. The first 220 microseconds is spent at the altitude zero position. From thereon, during the remainder of the altitude interval, a radial line is drawn from this point indicating the algebraic difference to the altitude of the transmitting plane (the lines 29, 26).

In the 620 to 1100 microsecond interval the radial position of the spot is fixed at the head of the bearing vector whereas the 1100 to 2200 microsecond portion draws out the heading vector representation intersecting the bearing vector at the bearing dot and terminating there (25, 28).

Figure 3:
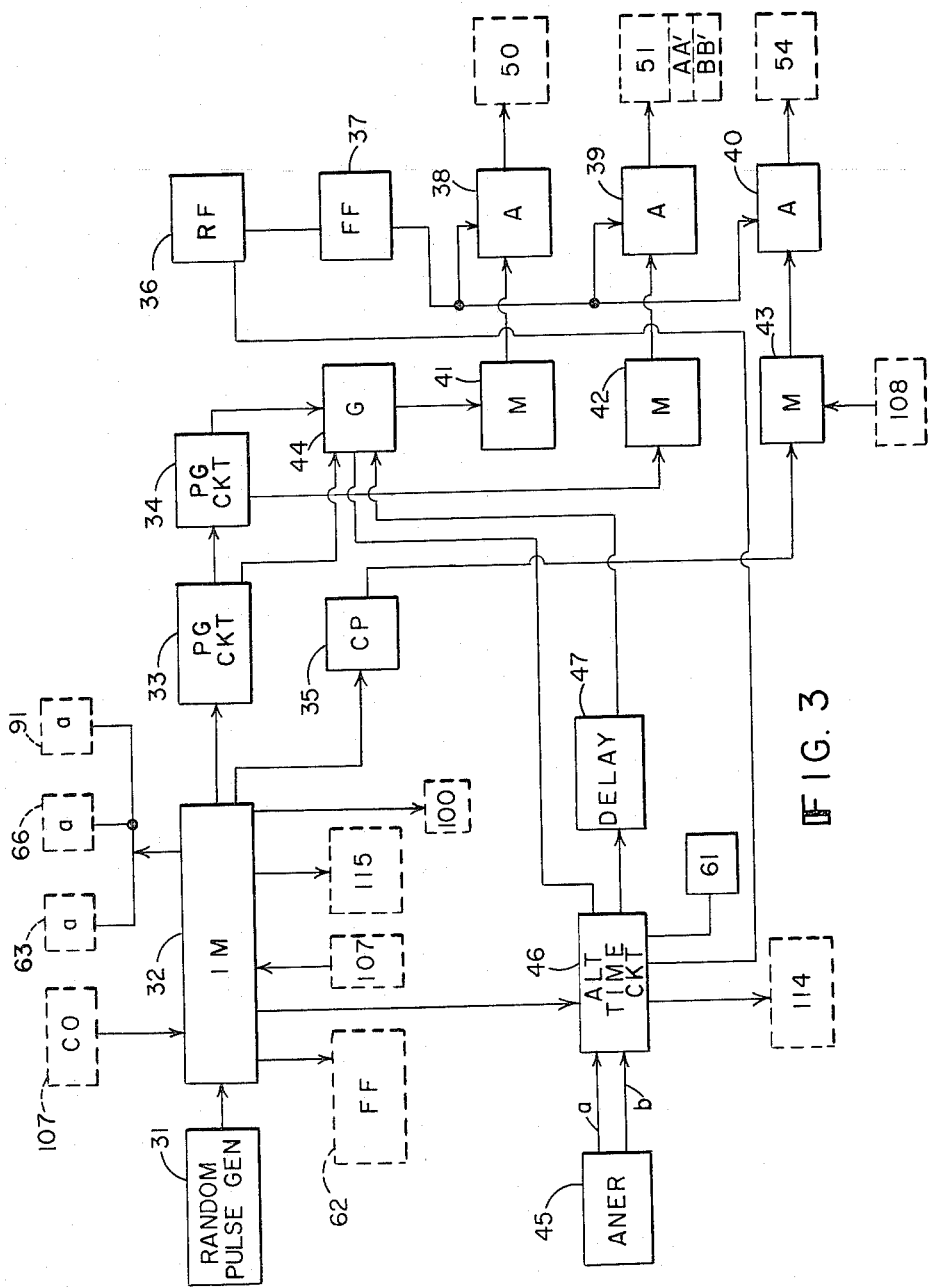
FIGURE 3 is a schematic diagram of the transmitter circuit.

Referring now to FIGURE 3, a quartz crystal oscillator 36 operating at a frequency of W/18 cycles per second drives harmonic generator 37 which generates a frequency of W (e.g. 800 megacycles). Harmonic generator 37 in turn drives RF power amplifiers 38, 39, and 40. Power amplifier 38 drives the antenna component O through adjustable phase shifting network 50. Power amplifier 39 drives antenna system AA', BB', the latter through 90° phase shift 51. AA' and BB' are the Adcock mutually perpendicular pairs forming in this case the antenna component which is omnidirectional in amplitude but shifts phase with direction of transmission. As shown in FIGURE 4, power amplifier 40 drives antenna component 53, 55 through "magic T coupler" 54, which antenna combination, as described more fully below, provides circular polarization. Pulse modulation control for the transmitter is applied through keying modulators 41, 42, and 43. A random pulse generator 31 preferably of a mechanical type in order to provide appropriate intervals between pulse initiation actuates intermodulator 32 which turns off the receiver and triggers monostable MV pulse generator circuit 33 and altitude monostable MV pulse generator circuit 46. The intermodulator (see FIGURE 12) is similar in structure to that described in the first co-pending application referred to above. It permits the receiver sections to be on continuously, but turns them off and triggers the transmitter sections when actuated, as for example, by the action of the random pulse generator. As explained further below, it is also actuable by the coincidence circuit. Further as indicated below the intermodulator actuates the radial deflection circuits at the start of each of the second pulses in each pair of command pulses. The structure described in said earliest copending application 629,842 refers to the random pulses being provided by a scintillation crystal of sodium iodide containing dispersed radium chloride. The flashes of light from the interaction of the radio-active particles and the crystal illuminate the photo cathode of a photo amplifier tube which needs large negative voltage pulses in its anode. A scaling circuit which filters out extremely short or long intervals between pulses so that the resultant pulses are fed to a mono-stable multivibrator portion of the intermodulator actuatable only by the positive pulses. This multi-vibrator drives two cathode coupled amplifiers 32B and 32C. One of the amplifiers 32B is arranged to drive the transmitter only when the gating pulse is positive. The other amplifier 32C actuates a phase inverter 32E which cuts off the receiver sections. Pulse circuit 33, which for example can consist of a multivibrator or series thereof with appropriate buffer stages turns on electronic gate 44 to actuate modulator 41 for a pulse duration of about 1100 microseconds. Altitude time circuit 46 (see FIGURE 13) is a mono-stable multi-vibrator pulse generator circuit. It has two-mono-stable multi-vibrators, one for transmission of altitude pulses and one for comparison of received pulses. The aneroid arrangement can be like that in the earliest co-pending application, wherein a control transformer is mechanically linked to an aneroid capsule and coupled a means for shifting basic frequency with changes in zone, i.e. altitude zoning control. The altitude sensing element (aneroid) both mechanically rotates the rotor of the transformer and also causes appropriate shifts in frequency for both the transmitter and receiver. Pulse circuit 46 has a variable length pulse output governed by aneroid element 45 through path "$a$" which represents continuous change by means of a rheostat responsive to the aneroid and path "$b$" which represents step-wise zone control, which in addition, as in both said copending applications changes the basic frequency of the entire system as a plane goes across an altitude zone boundary. The aneroid comprises an altitude sensing device which both rotates the rotor of the transformer and causes appropriate shifts in frequency for both the transmitter and receiver. The arrangement of this interlocking altitude zoning and altitude reading device is illustrated in FIGURE 14 wherein ($a$) is the general schematic diagram and side view, ($b$) the front view of a portion of the aneroid linkage action, ($c$) a left front view of insulating block 712 with its eight conducting centers, and ($d$) a right front view of insulating block with its motor buttons and ($e$) a right front view of the crystal turrets.

The expansion and contraction of aneroid capsule 742 caused by changes in air pressure with altitude is arranged to proportionately rotate the rotor in transformer 84 and to also step-wise bring a different operative quartz crystal into the transmitter and receiver oscillators. The same aneroid functions for both transmitter and receiver, and the shifting from one crystal to another in both the receiver and transmitter system oscillators 61 and 36 is accomplished electro-mechanically. FIGURES 14$a$, $b$, $c$, $d$ and $e$ illustrate the aneroid, control transformer, the mechanically coupled shifting means, and the transmitter responsive shifting means, the receiver responsive shifting means being substantially identical with that of the transmitter-responsive shifting means and not illustrated. Wiring network 739 controls the receiver shifter simultaneously and in the same manner as that of the transmitter.

Capsule 742 in response to changes in air pressure moves linkage 741 pivoted on point 740 on gear 719. Gear 719 meshes with spur gear 718 which in turn is mounted on shaft 716. One end of shaft 716 contains gear 721 which meshes with gear 722 mounted on shaft 723 of control transformer 84.

The other end of shaft 716 passes into an insulating cylinder 717 which has a slip ring connected electrically to a spring arm 714. The movement of the aneroid thus causes arm 714 to rotate. Arm 714 is normally in contact with one of (in this case) eight conducting segments 713 mounted on an insulating block 712 through which each segment makes a terminal 813. Each terminal 813 is permanently wired to a corresponding terminal 810 extending through insulating block 811 to a metal button 809. In any particular position one of these buttons 809 is in contact with a spring arm 808 mounted on the end of a shaft 803. On shaft 803 is also mounted a slip ring 814 which is electrically connected to arm 808 of a crystal turret assembly 802 and, at its end opposite arm 808 to a gear reduction motor 801. Motor 801 connects to power supply 738 through relay contacts 736 which are normally closed when no current flows through coil 737. Arm 714 is electrically connected through slip ring 17 to one end of this coil 737, while arm 808 is connected electrically through slip ring 814 to one terminal of the motor. The other end of coil 737 is connected to power supply 738. Energizing of coil 737 is accomplished from 714, contacts 713, wires 739, contact 809, arm 808, slip ring and brush 814 and thence to the other terminal of power supply 738.

The crystal turret 802 contains eight quartz crystals 732 of different frequency as desired. Each crystal 732 has a pair of contacts 804 which permits engagements with a corresponding pair of conducting spring arms 806 leading to the transmitter oscillator 17. Thus, at any given time only one crystal is operative in oscillator 17.

The mechanical movement of arm 714 by the aneroid system from one sector to another causes the relay 737—737 to de-energize, which in turn starts the motor 801 to rotate. This rotation turns the turret 802 and then the spring arm 808 makes contact with the particular button 809 corresponding to the new position of arm 714. When this contact is made the resulting current reenergizes the relay coil thus opening contacts 736 and stopping the motor.

Where the turret is in the receiver an additional control is provided to allow drum 811 to be rotated in either direction so that a navigator may interrogate an adjacent zone to his own, otherwise, drums 712 and 811 are in fixed position. To avoid sticking on the surface of the sector, an electromagnet can be placed on shaft 716 adjacent to arm 714 and be supplied with an oscillating current. The resulting vibrations of arm 714 preventing sticking. The aneroid circuit 46 contains a circuit element as a part of an MV circuit which determines its pulse length continuously variable in accordance with altitude with respect to the zone center. At will a pilot may interrogate the zones above and below him. The altitude marker will show the results of such an interrogation for its range of altitude is exactly three zones. It either works in its appropriate zone or the one above or below as the rheostat rotates one revolution for three zone changes, the stepwise control keeping the stator at its appropriate place with respect to the zone control so that for central zone position it is at the halfway point on the rheostat at the zone center and thus its attendant MV 46 sends out a nominal pulse (300 microsecond) or for central lower zone (167 microsecond) or central upper zone (433 microsecond) depending on whether pilot is interrogating upper or lower neighboring zone. 46 contains two monostable multivibrators, one for transmission of altitude dependent pulses, the other for comparison with received pulses. When the transmitting MV is triggered, it sends a pulse both to gate 44 through a delay line 47 and also directly to 44 to produce the double altitude pulses wherein the first is variable and the second is a definite time later equal to the delay time of 47.

As pulse generator circuit 33 reverts to its quiescent state, pulse generator circuit 34 is triggered actuating modulator 42 for the fixed duration of the 34 pulse of approximately 1100 microseconds.

Command pulse circuit 35 which is a system of multivibrators and buffer amplifiers is triggered by a pulse generator portion of intermodulator 32 after the beacon pulses to give out a series of pulses which actuate modulator 43.

For ships, where altitude and ground reflection problems do not exist altitude components 45, 46, and 47, gate 44, third power amplifier 40 and the separate circularizing polarizing antenna are omitted. Instead, pulse generator circuit 33 and command pulse circuit 35 both actuate modulator 41 of power amplifier 38 which feeds vertical isotropic radiator O. The pulse train is the same except that the altitude portion is omitted.

Figure 5:
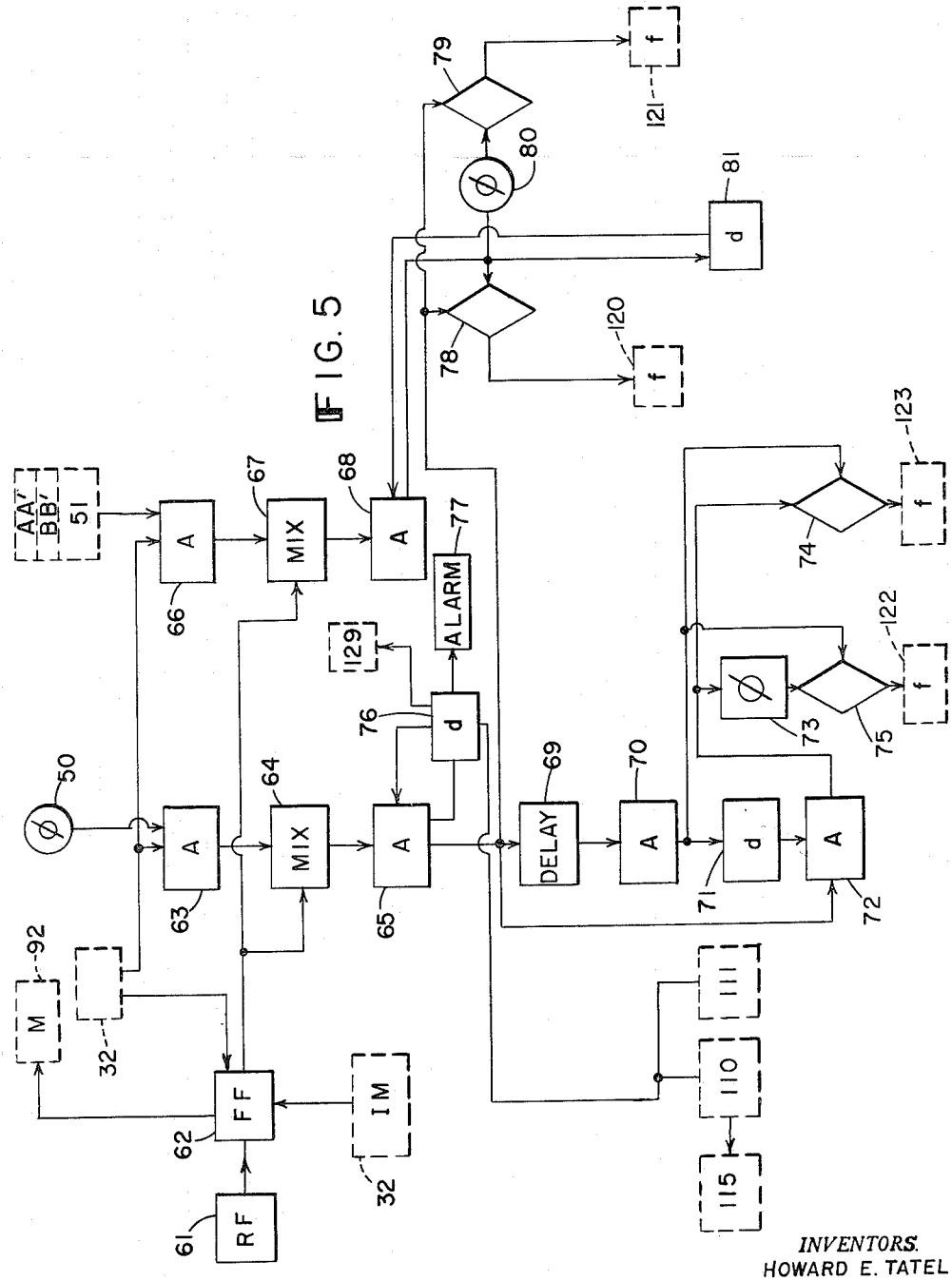
FIGURE 5 is a schematic diagram of the bearing-heading receiver channels.
Figure 6:
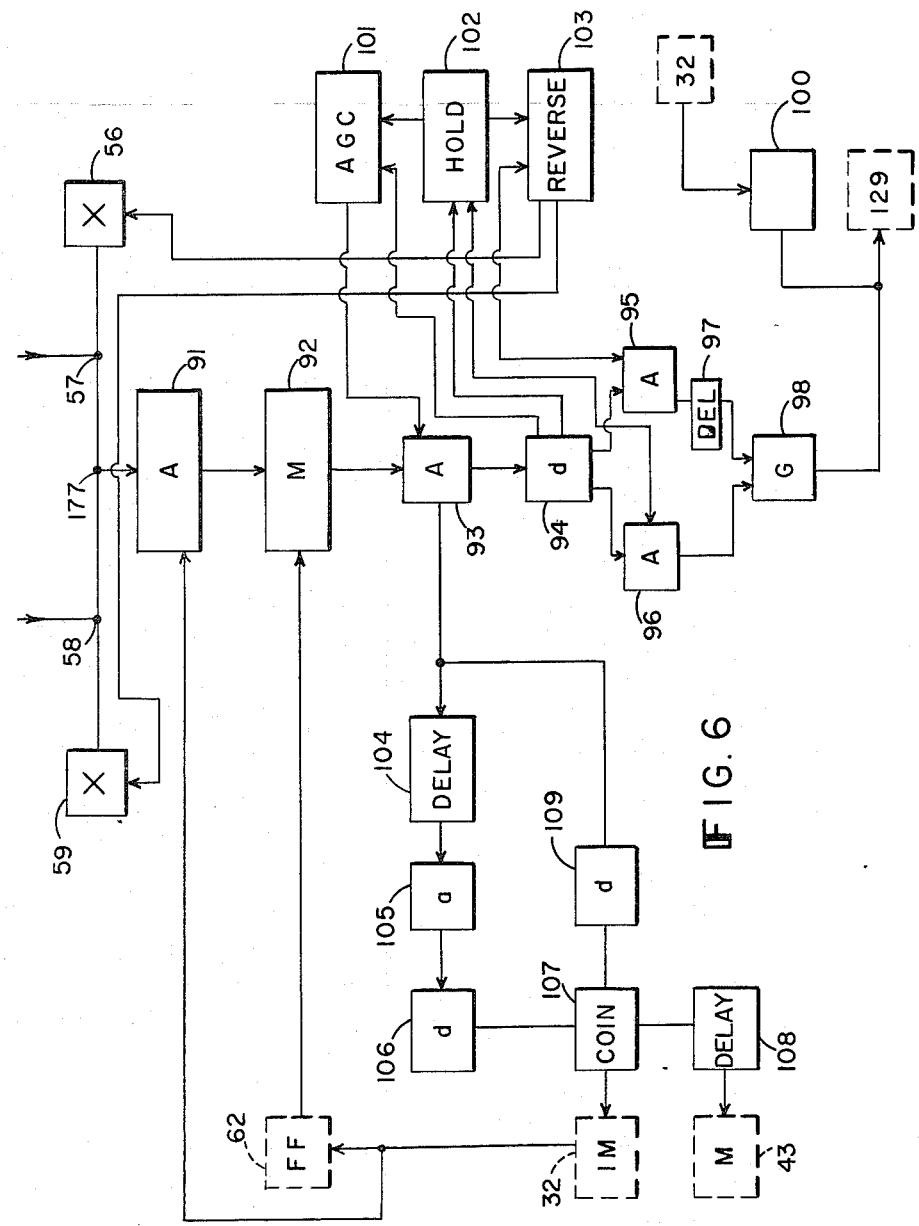
FIGURE 6 is a schematic diagram of the command receiver channel.

In the receiver there are three channels as shown in FIGURE 5. The first channel comprising a superheterodyne system of RF amplifier 63, mixer 64, IF amplifier 65, and detector 76 which is connected back to amplifier 65 by an automatic gain control loop. This channel receives its signal from isotropic radiator O through system zero adjustment phase shifting network 50 and a T-junction with the transmitter line. The second channel receives its signal from crossed Adcock pairs AA', BB' through phase shifting network 51 and a T-junction with the line to the transmitter. T-junctions are arranged in position so that transmit-receive functions may be served by one set of antennas. Appropriate line lengths to transmitter and receiver are employed so that each unit "sees" a high impedance in service while the other is keyed off by the multivibrator. This second channel comprises a superheterodyne system of RF amplifier 66, mixer 67, IF amplifier 68 and detector 81 which connects back to amplifier 68 to form an automatic gain control loop.

The mixers of all receiver channels are supplied the injection signal by a harmonic generator 62 at frequency $w$ driven by a quartz crystal local oscillator 61 of basic frequency $w/18$ such that the difference between W and $w$ is the intermediate frequency. Intermodulator 32, which is similar to the intermodulator used in the two copending applications, controls the intermittent operation of the transmitter and in opposition RF amplifiers 63 and 66, and 91 and harmonic generator 62 gating these three latter elements so as to completely turn off the receiver when the local transmitter is on.

The IF signal from 65 feeds into gated phase-shifter amplifier 72, phase-sensitive detectors 78 and 79 in the bearing detector circuit and passes through delay line 69 to amplifier 70. From amplifier 70 the signal actuates phase-sensitive heading detectors 74 and 75 and also the gating detector 71. Amplifier 72 is normally off and operates only after the delay signal 69–70–71 is detected in 71 and biases the gate grid in 72 to hold 72 on for the duration of the pulse permitting the signal to pass through 72, be amplified and then fed into the heading phase sensitive detectors 74, 75.

Both gain-stabilized amplifier 70 and gain stabilized phase-shifter amplifier 72 deliver signals to the phase-sensitive detectors in the heading circuit, with amplifier 70 providing the phase reference signal for the signal from amplifier 72. The delayed phase standard wave train pulse from amplifier 70 at a high level, and the second part of the heading wave train pulse, phased through the phase characteristics of the radiating quadrupole antenna by heading angle and coming from amplifier 72 at a lower level simultaneous, and separately drive phase sensitive detectors 74 and 75, 72 driving 75 through 90° phase-shifting network 73. The output of 75 is proportional to sine of the heading, while the output of 74 is proportional to the cosine of heading. The phase characteristics of amplifier 70 are adjusted to compensate for the phase shift in 69 and other parts of the circuit so that the output of the heading detectors corresponds to zero angle when the heading is at 0°.

Control for indicator intensity 129 is provided by the output of detector 76, which also serves to actuate alarm 77 when a suitable pulse is received in channel 63. Detector 76 also serves to trigger altitude comparison pulse generator 110, altitude coincidence detector 111.

In the second channel, the output from IF amplifier 68 drives phase-sensitive detector 78 and via 90° phase-shifting network 80 also drives phase-sensitive network 79 as the signal to be measured at a lower level than the output from IF amplifier 65 (first channel) which serves as the phase standard. The output from detector 78 is proportional to cosine of the bearing, while the output from detector 79 is proportional to the sine of the bearing.

Figure 8:
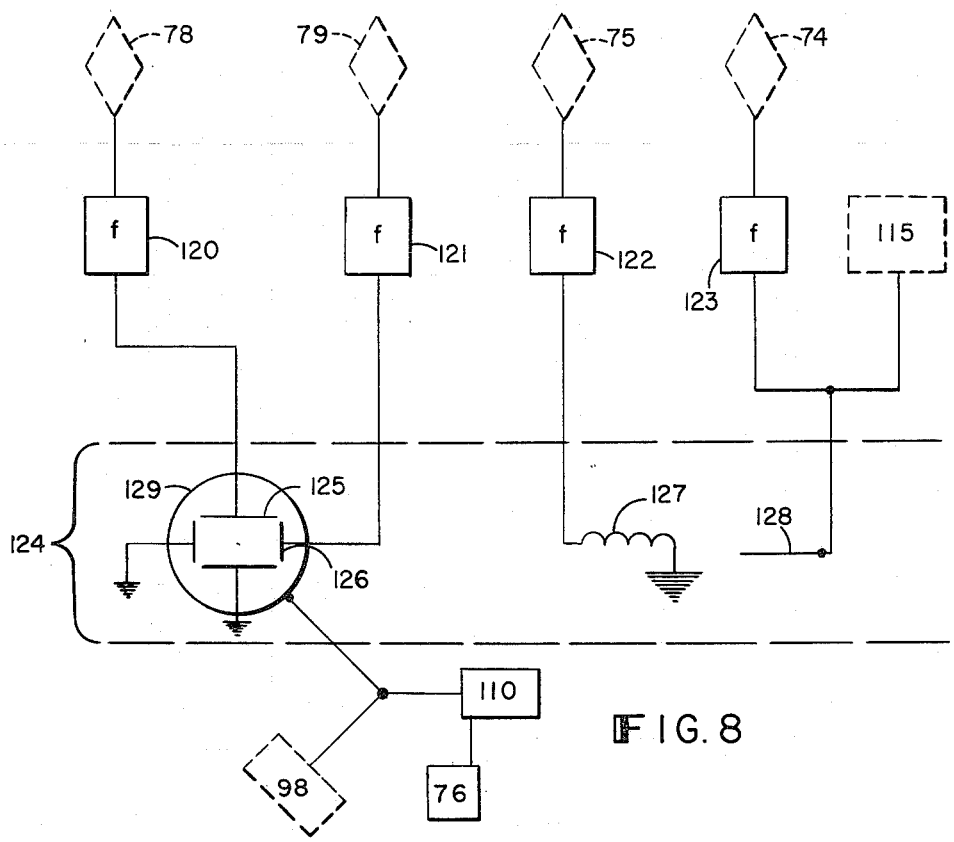
FIGURE 8 is a schematic diagram of the cathode ray tube display circuit.

As shown in FIGURE 8, the phase detectors 74, 75, 78, 79 feed into pulse amplifiers 123, 122, 120, 121 respectively. These in turn drive the coil-radial deflection system and the vertical, horizontal plates of cathode ray indicator. The outputs of 122, 123 have time constants which are about 400 microseconds so that the voltage applied to the heading system (coil-radial deflector) rises slowly and thereby draws out a line showing the vector of heading.

Figure 7:
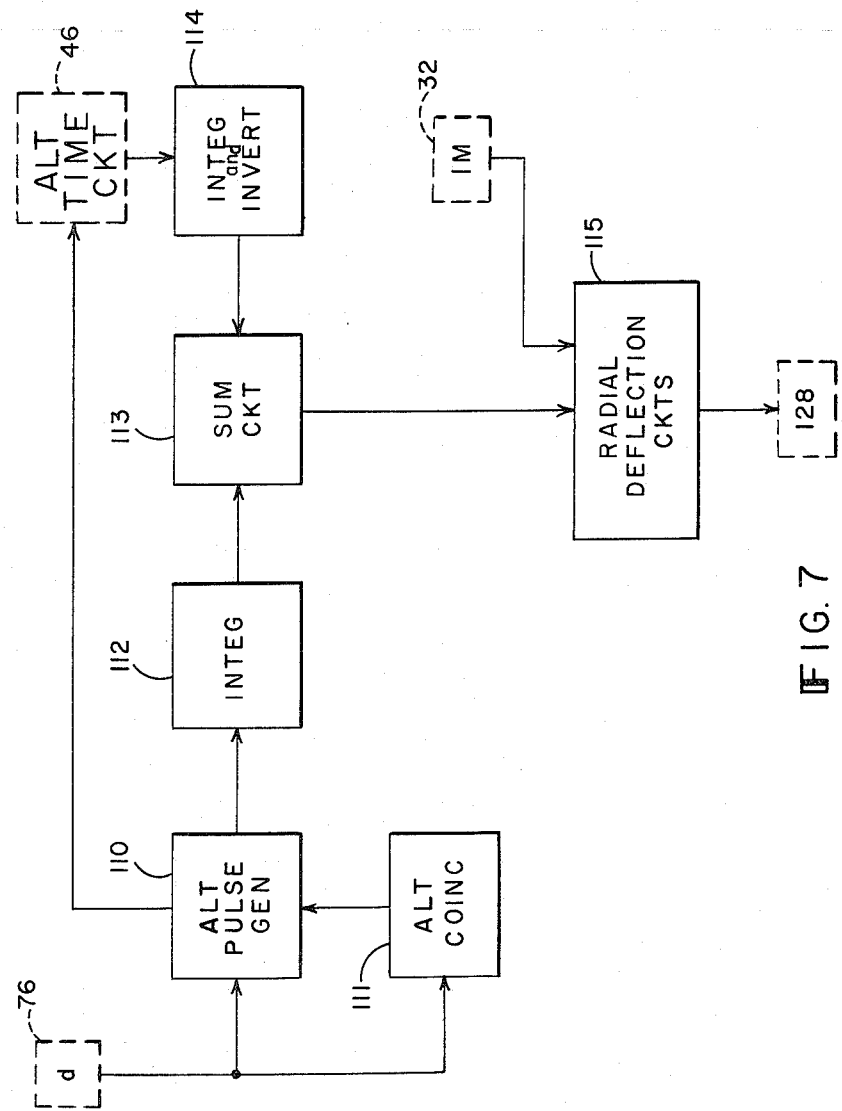
FIGURE 7 is a schematic diagram of the altitude comparison circuit.

As shown in FIGURE 7, the first channel also serves to feed the altitude pulses received by the vertical isotropic antenna component to the altitude comparison circuit. The detected signal from detector 76 is fed to altitude pulse generator circuit 110 which has an appreciable input time constant (e.g. 20 microseconds) to eliminate static and command pulse interference. Circuit 110 contains a monostable multivibrator in series with a first amplifier. The detected pulse from 76 is thus amplified and triggers the monostable multivibrator to generate a 600 microsecond pulse. This pulse is coupled to the CR radial deflection electrode 115 so that the spot is deflected to the altitude annulus 21. The pulse is also fed to a second amplifier of 110 which is a doubly controlled amplifier and its second control grid is gated off by the delayed coincidence pulse through 111 from 76. Coincidence detector 111 is also fed by detector 76 and contains a delayed coincidence circuit such that any two pulses 120 microseconds long produce an output pulse of about 600 microseconds duration. The 120 microsecond interval corresponds with the fixed length of the second transmitted altitude pulse. The result of coincidence detector 111 cutting off the output or second amplifier of 110 off is to produce in its anode circuit a pulse equal in length to the transmitted altitude pulse plus 120 microseconds. At the time that the MV of 110 is triggered, the triggering pulse also fires the internal comparison MV of 46. This pulse from the comparison MV 46 is made to be 120 microseconds longer than the transmitted altitude pulse. These two altitude pulses, one from 110 and one from 46 (the latter opposite in sign from the former) are fed respectively to linear integrator 114 and linear integrator and inverter 112 which convert them to triangular pulses. These two pulses of opposite sign are simply coupled together through isolating resistors which form a simple summing circuit 113, coupled through a buffer amplifier into the radial electrode deflection circuit 115 of cathode ray tube 124. If they are of different height there is an output, the size and sign of the output depending respectively on the difference in altitude and upon which plane is higher. Standard sign conventions will be used. This output from 113 feeds into the radial deflection electrode of the CR tube. In its quiescent state the deflection voltage is such as to hold the radial position of the beam at the zero altitude position. It remains there for the first few microseconds of the received beacon pulse. It does not move until the shorter pulse ends. Then as the difference in the integrated output 113 increases the spot moves tracing out a radial line, the length and direction indicating the difference and the relative plane position. While this is going on the ADF determines the angular spot position with an angle equal to the bearing.

The short terminal pairs of pulses in the transmitted wave train, i.e. the command pulses are preferably of a type requiring coincidence to actuate the receiver, e.g. a delayed coincidence of 100 microseconds for planes, so that altitude pulses would not trigger this system. The command pulses are received by a separate third channel comprising superheterodyne RF amplifier 91 receiving its signal from isotropic polarizing antenna array 53—55, mixer 92 and IF amplifier 93. Mixer 92 receives its local oscillator signal from harmonic generator 62, and RF amplifier 91 is simultaneously gated off with the other two receiver channels by intermodulator 32 during the brief transmission intervals.

The wave train from the IF amplifier is divided: one part is detected in detector 109, the other is passed through a 100 microsecond delay line 104 to amplifier 105 then to detector 106. Both detectors 106 and 109 energize the input of coincidence circuit 107, so that when two command pulses separated precisely 100 microseconds are detected in 106 and 109 a strong output is generated from coincidence circuit 107. This output is delayed a standard amount (5 microseconds) in delay line 108 and then actuates modulator 43 in the local transmitter causing local power amplifier 40 to send out a signal through local polarizing radiator 53—55 to the receiver on the transmitter craft on which the transmitted pulse originated. However, before the transmission of this response the coincidence circuit simultaneously shuts off all receiver channels via intermodulator 32. Intermodulator 32 contains an amplifier buffered monostable multivibrator of pulse length of about 10 microseconds which is triggered by the coincidence command pulse from 107. This pulse feeds to all gated RF circuits 62, 63, 66, 91 preventing reception and regeneration while response to command is being made. Further, the coincidence circuit 107 is arranged to be self paralyzing for an interval greater than 100 and less than 300 microseconds after an output pulse is generated to prevent response of the receiver to ground reflected command pulses. The transponse is preferably a single pulse. To avoid other planes, than the original transmitting plane from displaying the transponse, the intensity control of the cathode ray tube is biased for display to receive only when the 100 microsecond code of the transmitted pulse train initiates it from the intermodulator for the duration of the command cycle and registration is available only during the sequence of command transmission. Since substantially no two neighboring transmitters will be on at the same time, only the transmiting plane is set to respond to the intensity control signal. At the instant of response the beam of the CR tube is oriented by the bearing signals from 78 and 79 operating on the deflection plates 125 and 126 of the cathode ray tube 124 via pulse amplifiers 120 and 121.

The third channel, in addition to actuating the transponse, also preferably rejects ground reflections response by inhibiting the response of the intensity control grid 129 of the cathode ray tube 124 to reflected pulses. This is done by comparing the signals received at the channel by the two paths through coupler 54. Through one path via 58 comes the correct polarization (direct path), while through the ground reflected path via 57 comes the incorrect polarization (reflected). The electrical length of the lines from 57 to 177 and 178 to 58, 58 to 177, 59 to 58 and 57 to 56 are odd quarter wave lengths, e.g. ¼ wavelength. High frequency switches 56 and 59 (e.g. diodes with high RF impedance when biased in reverse and low when biased forward) allow the signals of first one polarization and then another to pass. These diodes have appropriate series tuning impedance so that they reflect either high or low impedance into the coaxial line at 58 or 57 depending on their state of control bias.

Upon reception of a transponse this third channel is in its normal reception state with switch crystals 59, 56 biased for open path via 58 and closed path via 57 into RF amplifier 91. This transponse signal is amplified by the zone controlled receiver 91, 92, 93 and detected in 94. The detected signal is fed to gated pulse amplifiers 96, 95, AGC 101, hold circuit 102.

Figure 10:
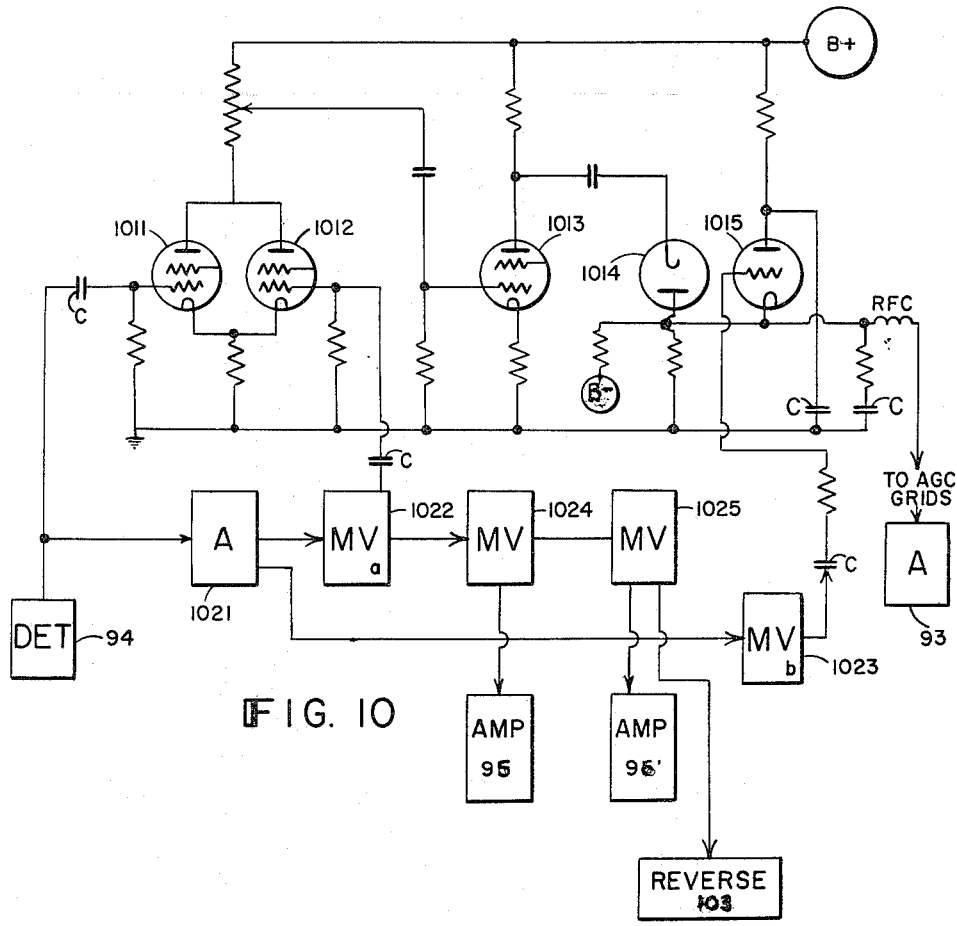
FIGURE 10 is a more detailed schematic diagram of a portion of the receiver command channel.

Details of circuit 102 and 101 are shown in FIGURE 10. The negative detected pulse is amplified by buffer pulse amplifier 1021 and triggers two monostable multivibrators 1022 and 1023. 1022 has a pulse width of about ⅓ the standard transponded pulse and 1023 has a pulse width of about 1.5 times the transponded pulse width (standard transponded pulse 2–3 microseconds).

Tubes 1011 and 1012 with common anode load are normally biased in a high conduction state. At the onset of a detected pulse from 94 the grid of 1012 is cut off by MV 1022 effectively unshorting 1011 anode. The detected pulse is amplified by 1011 and amplifier 1013. The output of 1013, the AGC pulse, is therefore responsive to the amplitude of the detected signal. The AGC grids of IF amplifier 93 are then biased by an amount dependent upon the detected pulse through diode 1014 and when MV 1022 cuts off 1012 and thereby 1011, the grids remain at this potential giving a reduced and constant IF gain for the duration of the transponded pulse. Tube 1015 normally holds the grids of the amplifier 93 near ground potential. The pulse from MV 1023 cuts this tube off from its conductive state allowing the above mentioned AGC pulse to bias these grids. The pulse charge is removed when MV 1023 reverts to its original state causing 1015 to do the same, the grids of 93 are biased to their quiescent state and the system is prepared for a next pulse.

When MV 1022 goes off, its trailing pulse, appropriately coupled fires the monostable MV 1024 whose pulse length is about 0.4 the transponded pulse length. This pulse gates on the normally off pulse amplifier 95. When MV 1024 goes off, its trailing pulse is fed through appropriate coupling to monostable MV 1025 which thereby triggered. Its pulse duration is also 0.4 the transponded pulse length MV 1025 is coupled to gated pulse amplifier 96 turning it on (just as 95 goes off) MV 1025 is also coupled to diode reversing circuit 96.

The reverse circuit 103 biases the switching diodes in phase opposition. In quiescent state these are biased for signal passage via 58 to receiver input 91. The MV pulse from 1025 reverses this state and the signal is blocked through 58 and passes via 57 to receiver input 91.

Thus, after the gain is stabilized by the AGC pulse, the first half of the remaining pulse passes through pulse amplifier 95 and the second half through 96. The output from 95 is transmitted through delay line 97. Both signals from 95 and 96 arrive at the same time at comparison gate 98 and by simple coupling are added at the input of 98. The output from 95 to 96 are out of phase, 95 generating a positive pulse and 96 a negative. Thus, if the signal is properly polarized (via 58) the sum signal at the input of 98 will be positive, if the signal via 57 which carries the improper polarization, the signal at the input of 98 will be negative. Gate 98 is set to trigger on only a positive pulse and generates a pulse of fixed amplitude. This pulse is fed to the CR intensity grid 129. Thus, the intensity of the CR indicator goes on only if the received signal is polarized the same as a pulse traversing the direct plane to plane path. A signal reflected at the ground has its polarization altered and can be rejected by not actuating intensity control 98.

When the intensity is triggered on, the bearing signal developed by receiver channels 1 and 2 have already provided the proper deflection voltage for the electron beam of the CR tube placing it at its proper orientation. The linear time base generator triggered at the onset of the transmission of the second command pulse of each pair also varies the potential of the central radial deflection electrode so that the radial position of the beam is appropriate for the time of propagation of the radio waves plus the standard circuit delays.

Figure 9:
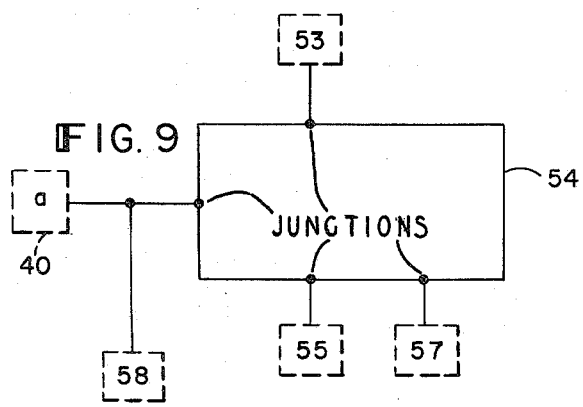
FIGURE 9 is a schematic diagram of the antenna coupling circuit for the range antenna.

The antenna system for ships is preferably a vertical dipole and a symmetrical progressively phased quadrupole arrangement of dipoles. The antenna system for planes preferably incorporates additional means to suppress ground echoes of transponse by use, for the command and transponse, of a horizontal antenna system transmitting isotropically in the horizontal plane. This is placed symmetrically with respect to the vertical isotropic radiator making a symmetrical crossed dipole system for generating polarized radiation. The illustrated horizontal antenna 55 is a horizontal cloverleaf quadrupole array of dipoles radiating almost uniformly in a horizontal plane and fed in conjunction with a separate vertical isotropic radiator. The line lengths are adjusted so that the system radiates with a phase appropriate to the generation of circularly polarized radiation. Ground reflections cause this to become modified, either to elliptical or opposite circular polarization. Only correctly polarized radiation is passed by the "magic T" coupler, 54 to receiver 91 via 58 whereas the incorrect or reflected radiation goes via 57 to receiver 91. This coupler preferably, comprises the network of transmission lines shown in FIGURE 9. There, the line distance between the junctions to 40, 58 and to 53, to 40–58 and to 55 and to 55 and to 57, is one-quarter wave-length, while the distance between the junctions to 53 and to 57, is three-quarters wavelength.

The variable circuit element in the altitude-sensing portion of the system may be an arm of a rheostat caused to move by the expansion or contraction of the aneroid to give a resistance proportional to altitude. The zone frequency control can be similar to that described in the first copending application. The variable resistance determines the pulse length of the first altitude pulse and a second one ganged with it determines the pulse length of the second or comparison pulse.

Circuit 115 is a linear time base generator which is triggered by the intermodulator 32 at the start of each of the second pulses in each pair of command pulses. 115 is coupled to the radial deflection electrode 128 and as in a radar system, starts the beam near this central electrode allowing it to displace uniformly with time to indicate range.

In use of multivibrators, buffer amplifiers are conventionally used to prevent feed back or cross coupling and to transmit either a plus or minus pulse only dependent on function. In many places where this use is obvious such amplifiers have been omitted.

One advantage of this system is the alarm it gives which is unique and unaffected by the difficulties an alarm would have in radar—no ground clutter—only planes within a zone are affected. Alarm 100 is gated on by the same signal from intermodulator which drives the linear time base 115. During this interval it counts the received pulses on a high speed digital counter at the onset of each command series. The output of the digital counter operates a variable tone generator. If the count changes, the generated tone changes. This change in tone is a special warning to the pilot telling him that the number of nearby craft has changed.

The display bearing-range and/or bearing-altitude may be had by using just those parts of the system involving the generation, reception and display of their respective signals.

I claim:

1. A system of radio communication comprising a plurality of craft each having an RF transmitter having means for providing a coded wave train of identical RF frequency containing two substantially equal time length and consecutive pulses and a command pulse sequence; at least one horizontally omnidirectional substantially isotropic antenna component; a second antenna component characterized in that the RF signal transmitted thereby is constant in RF amplitude but has a phase angle which depends on the angle H between the direction line from the transmitter and a local transmitter reference line; said first consecutive pulse supplying a said isotropic component; said second consecutive pulse supplying said second component; said command pulse sequence supplying a said isotropic component; an RF receiver containing a first receiver channel supplied by a said isotropic component; a second receiver channel supplied by an antenna component characterized in that the phase angle of the signal it receives depends on the angle B between the direction line from the transmitter and a local receiver reference line; a third receiver channel supplied by a said isotropic component; means associated with said first two channels for providing a first resultant signal responsive to the angle B; means associated with said first channel for storing said first consecutive pulse as received until said second consecutive pulse is received, and for processing both said pulses so as to yield a signal proportional to angle H; and means associated with said third receiver channel for causing the transmitter to emit a responsive pulse sequence upon receipt by one craft of said command pulse sequence; said responsive pulse sequence being receivable only on the craft originating the command pulse sequence to produce a third resultant signal responsive to the distance between said two craft.

2. Claim 1, wherein random switching means are provided to alternate operation of transmitter and receiver in each craft in such a manner that substantially no two transmitters are on at the same time.

3. Claim 2, wherein means are provided to give an alarm upon the arrival of each new neighboring craft.

4. Claim 1, wherein said responsive pulse sequence is receivable by said third receiver channel of the craft originating the command pulse sequence.

5. Claim 4, wherein said isotropic antenna transmits one component which is circularly polarized.

6. Claim 4, wherein said isotropic antenna component supplying said third receiver channel has associated means for differentiating between directly received responsive signals and other signals.

7. Claim 6, wherein said third receiver channel has associated isotropic circular polarizing receiving antenna component and hybrid junction coupling circuit actuating one output with one polarization signal another with the reverse polarization.

8. Claim 7, wherein automatic switching is incorporated to shift input from one polarized component to the other.

9. Claim 1, wherein said command pulse sequence comprises a coded pulse train and said third receiver channel actuates said responsive pulse sequence only upon recognization of said coded pulse train in its precise form.

10. Claim 1, wherein said command pulse sequence comprises a plurality of pulses separated from one another by predetermined times, and said third receiver channel actuates said responsive pulse sequence only when said pulses are received separated precisely by said predetermined times.

11. Claim 1, wherein said craft are planes, said coded wave train contains at least one pulse whose time-length is responsive to the altitude of the transmitting craft and means associated with said receiver on another craft for receiving such pulse and comparing such received pulse with a signal responsive to the local altitude to provide a fourth resultant signal proportional to altitude difference.

12. Claim 11, wherein said altitude responsive pulse is a subpulse of said first consecutive pulse.

13. Claim 11, wherein means are provided to cause said four resultant signals to supply electrical voltages to the appropriate inputs of an electrostatic deflection cathode ray tube having an axially aligned radial deflection electrode at its screen and a coaxial coil wound around its neck so as to provide a heading-bearing vector, an altitude-bearing vector, and a range-bearing vector.

14. Claim 1, wherein means are provided to give an alarm upon the arrival of each new neighboring craft.

15. A method for simultaneously determining the relative angles of direction and distance of a plurality of craft each equipped with a transmitter and receiver, comprising substantially continuously transmitting in all directions from each craft a radio signal containing both information as to the angle between the forward direction of the transmitting craft and a line to a receiving craft and an interrogating sub-signal, receiving said signal on a second craft, providing on said second craft a second signal containing information as to the angle between its forward direction and said line causing said second craft transmitter to emit a signal responsive to said received sub-signal, causing said first craft to receive said responsive signal and translating said signals so as to display on one craft the heading, bearing and range of another such craft.

16. Claim 15, wherein altitude information is transmitted, compared with local altitude at the receiver, and translated so as to also display altitude difference.

References Cited in the file of this patent

UNITED STATES PATENTS

| | | |
|---|---|---|
| 2,403,603 | Korn | July 9, 1946 |
| 2,505,314 | Wallace et al. | Apr. 25, 1950 |
| 2,568,568 | Stansbury | Sept. 18, 1951 |